United States Patent [19]
Beck

[11] Patent Number: 5,697,346
[45] Date of Patent: Dec. 16, 1997

[54] METHOD FOR USING SONIC GAS-FUELED INTERNAL COMBUSTION ENGINE CONTROL SYSTEM

[75] Inventor: Niels J. Beck, Bonita, Calif.

[73] Assignee: Servojet Products International, San Diego, Calif.

[21] Appl. No.: 359,932

[22] Filed: Dec. 20, 1994

Related U.S. Application Data

[63] Continuation of Ser. No. 213,479, Mar. 16, 1994, abandoned, which is a continuation of Ser. No. 68,922, May 28, 1993, abandoned.

[51] Int. Cl.$^6$ .............................. F02B 15/00; F02B 1/00
[52] U.S. Cl. .................. 123/494; 123/1 A; 73/23.31; 73/116; 250/339
[58] Field of Search ..................... 73/23.2, 23.31, 73/24.01, 116; 250/339; 123/339.1, 90.15, 486, 339.11, 339.12, 494, 1 A

[56] References Cited

U.S. PATENT DOCUMENTS

| | | | |
|---|---|---|---|
| 3,343,403 | 9/1967 | Romani et al. | 73/24.01 |
| 3,554,004 | 1/1971 | Rauch et al. | 73/24.01 |
| 3,557,605 | 1/1971 | Lanneau et al. | 73/24.01 |
| 3,762,197 | 10/1973 | Roof et al. | 73/24.01 |
| 3,789,655 | 2/1974 | Passeri | 73/24.01 X |
| 3,798,528 | 3/1974 | Molyneux | 73/24.01 X |
| 3,815,562 | 6/1974 | Showalter et al. | 123/119 R |
| 3,885,720 | 5/1975 | Brennan | 123/148 E |
| 3,915,645 | 10/1975 | Funke et al. | 73/24.01 X |
| 3,981,176 | 9/1976 | Jacobs | 73/24.01 |
| 4,121,455 | 10/1978 | Haslett et al. | 73/194 M |
| 4,140,090 | 2/1979 | Lindberg | 123/75 B |
| 4,222,351 | 9/1980 | Kosaka et al. | 123/3 |
| 4,246,773 | 1/1981 | Haruta | 73/24 |
| 4,261,315 | 4/1981 | Geiger et al. | 123/486 |
| 4,280,183 | 7/1981 | Santi | 364/497 |
| 4,280,823 | 7/1981 | Szonntagh | 73/24.01 X |
| 4,283,256 | 8/1981 | Howard et al. | 204/1 T |
| 4,305,352 | 12/1981 | Oshima et al. | 123/90.15 |
| 4,344,397 | 8/1982 | Geiger et al. | 123/339 |
| 4,361,026 | 11/1982 | Muller et al. | 73/24.01 |
| 4,389,881 | 6/1983 | Butler et al. | 73/116 |
| 4,421,071 | 12/1983 | Paul | 123/1 A |
| 4,474,061 | 10/1984 | Parker | 73/149 |
| 4,555,932 | 12/1985 | Crosby | 73/24.01 |
| 4,563,894 | 1/1986 | Karrer | 73/24.01 |
| 4,599,892 | 7/1986 | Doshi | 73/49.2 |
| 4,622,939 | 11/1986 | Matekunas | 123/425 |
| 4,630,482 | 12/1986 | Traina | 73/597 |
| 4,663,977 | 5/1987 | Vander Heyden | 73/861.27 |
| 4,722,303 | 2/1988 | Leonhard | 123/3 |
| 4,993,386 | 2/1991 | Ozasa et al. | 123/417 |
| 5,002,020 | 3/1991 | Kos | 123/46 |
| 5,060,506 | 10/1991 | Douglas | 73/24.01 |
| 5,060,514 | 10/1991 | Aylsworth | 73/24.01 |
| 5,138,163 | 8/1992 | Butler et al. | 250/339 |
| 5,145,566 | 9/1992 | Logothetis et al. | 204/153.18 |
| 5,265,458 | 11/1993 | Usami et al. | 73/23.32 |
| 5,343,699 | 9/1994 | McAlister | 60/273 |

FOREIGN PATENT DOCUMENTS

| | | |
|---|---|---|
| 0913243 | 6/1954 | Germany . |
| 1046671 | 10/1983 | U.S.S.R. . |
| 0783748 | 9/1957 | United Kingdom . |

*Primary Examiner*—Harold Y. Pyon
*Attorney, Agent, or Firm*—Nilles & Nilles, S.C.

[57] ABSTRACT

According to the present invention, combustion properties of a gaseous fuel such as natural gas, utilized to fuel an internal combustion engine, are determined by measuring the velocity of sound in the gaseous fuel. This sound velocity measurement is utilized to control and adjust engine performance factors such as ignition timing, fuel flow rate, air/fuel ratio, fuel injection timing, and pilot fuel oil quantity and timing in dual fuel systems. The speed of sound in the gaseous fuel is used to define the hydrogen-to-carbon ratio in the fuel, which is employed in the invention to control and adjust various engine performance factors, and a number of display readouts.

16 Claims, 7 Drawing Sheets

| FUEL | H/C | FREQ.%(1) | MON.(2) | MIN(3) | BN(4) | STOICH A/F(5) | HV(6) | Ca(7) | KR(8) |
|---|---|---|---|---|---|---|---|---|---|
| HYDROGEN | | | | 0 | | 34.6 | | | 1088 |
| CARBON | | | | | | 11.55 | | | |
| METHANE, CH₄ | 4.0 | 100 | 140 | 100 | 0 | 17.3 | 21,500 | 1.00 | 126.5 |
| ETHANE, C₂H₆ | 3.0 | 70.4 | 101 | 42 | 7.5 | 16.2 | 20,400 | 1.44 | 63.2 |
| PROPANE, C₃H₈ | 2.67 | 56.0 | 97 | 35 | 10 | 15.7 | 19,930 | 1.77 | 42.4 |
| BUTANE, C₄H₁₀ | 2.50 | 48.1 | 94 | 24 | 100 | 15.5 | 19,620 | 2.08 | 31.6 |

*FIG. 12*

METHOD FOR USING SONIC GAS-FUELED INTERNAL COMBUSTION ENGINE CONTROL SYSTEM

This application is a continuation of application Ser. No. 08/213,479, filed Mar. 16, 1994, now abandoned, which is a continuation of application Ser. No. 08/068,922 filed May 28, 1993, now abandoned.

BACKGROUND OF THE INVENTION

1. Field of the Invention

The present invention relates to gaseous fuel-powered heat engines, and particularly to natural gas-powered internal combustion engines.

2. Description of the Prior Art

Gaseous fuels, and particularly natural gas, are desirable fuels for internal combustion engines, since they are potentially more efficient and less polluting than liquid fuels such as gasoline and diesel oil. However, there has been a severe problem in the art of adapting gaseous fuels to internal combustion engines in that the composition and quality of natural gas vary substantially according to the situs of derivation, and such variations in the composition and quality of natural gas require adjustment of a number of engine parameters in order to provide efficient burning and minimization of engine output pollutants.

Heretofore there has been no satisfactory means for measuring natural gas composition and quality, and in particular there has been no means for adapting any such measurement to the control of internal combustion engine parameters for optimum internal combustion engine efficiency in the burning of natural gas fuels and consequent minimization of undesirable engine output pollutants. Particularly important engine parameters to be controlled and adjusted for optimum burning of natural gas are fuel flow rate, ignition timing, air/fuel ratio, and fuel injection timing. Other important information relative to engine performance in natural gas-fueled internal combustion engines includes the stoichiomtric air/fuel ratio, the ratio of specific heats for the particular natural gas ($C_p/C_v$, $C_p$ being the specific heat at constant pressure, and $C_v$ being the specific heat at constant volume), the motor octane number of the particular natural gas, the heating value for the particular natural gas, the gas flow coefficient of the particular natural gas, the fuel density of the particular natural gas, the methane and butane numbers of the particular natural gas, and the maximum permissible natural gas fuel quantity per cycle of engine operation.

Prior to the present invention there has been no satisfactory means in the art for determining these various factors and displaying them during internal combustion engine operation. Applicant has discovered that the speed of sound in natural gas is an accurate indicator of the composition and quality of natural gas, no matter how widely its constituents may vary, and according to the present invention applicant utilizes such speed of sound ($U_s$) to control the necessary engine parameters for optimum fuel burning, and to determine the other useful fuel characteristics referred to above. Applicant is not aware of any such use of speed of sound in natural gas measurement for such purposes in the prior art.

SUMMARY OF THE INVENTION

In view of these and other problems in the art, it is a general object of the present invention to determine the composition of a gaseous fuel for internal combustion engines, such as natural gas, and utilize this determination to control engine parameters for efficient burning of the gaseous fuel.

Another object of the invention is to determine the H/C ratio of a gaseous fuel such as natural gas, and utilize such determination to control engine performance so as to maximize combustion efficiency and minimize engine output pollutants.

Another object of the invention is to provide method and apparatus for determining the composition of an internal combustion gaseous fuel by measuring the speed of sound in such gaseous fuel and employing such measurement to maximize engine combustion efficiency and minimize engine output pollutants.

A further object of the invention is to define a basic correlation between the H/C ratio in a gaseous fuel such as natural gas and KR, (i.e. $C_p/C_v$) (1544/molecular weight), i.e. the specific heat of the gas at constant pressure divided by the specific heat of the gas at constant volume times the universal gas constant divided by the average molecular weight of the gas.

According to the invention, the hydrogen-to-carbon ratio (H/C ratio) of a gaseous internal combustion engine fuel such as natural gas is determined by measuring the velocity of sound in the gas, with several formulae being utilized to provide a direct correlation between the velocity of sound in the gas and the H/C ratio over the entire composition range possible for the fuel, as for example for the four usual ingredients of natural gas including primarily methane ($CH_4$), and also some ethane ($C_2H_6$), propane ($C_3H_8$) and butane ($C_4H_{10}$). Thus, the velocity of sound in pure methane is approximately 1455 feet per second, pure ethane is approximately 1025 feet per second, pure propane is approximately 815 feet per second, and pure butane is approximately 700 feet per second, the velocity of sound through any mixture of these ingredients being an accurate determinator of the H/C ratio of the mixture. This speed of sound measurement is utilized in a microprocessor to adjust and control such engine parameters as ignition timing, fuel flow rate, air/fuel ratio, and fuel injector timing, and may also be utilized in a display unit showing any or all of the following: the $C_p/C_v$ ratio (the ratio of specific heat for the gas or gaseous mixture at constant pressure to the specific heat of the gas or mixture of gases at constant volume), the A/F (air/fuel ratio) of the gas or mixture of gases, the $U_s$ (velocity of sound in the gas or mixture of gases), the MON (motor octane number), the $H_v$ (heating value) of the gas or mixture of gases, the $C_d$ (flow coefficient) of the gas or mixture of gases, the density of the gas or mixture of gases, the MN (methane number) of the gas or mixture of gases, the ignition timing established for optimum combustion of the gas or mixture of gases, the maximum fuel permitted for the gas or mixture of gases, and the H/C (hydrogen to carbon ratio of the gas or mixture of gases.

BRIEF DESCRIPTION OF THE DRAWINGS

These and other objects and advantages of the invention will become more apparent from the following detailed description and the accompanying drawings, wherein:

FIG. 12 is a chart showing the relationshiip of various combustion factors with the components of natural gas.

DETAILED DESCRIPTION

Natural gas fuels for internal combustion engines and other heat engines typically consist of mixtures of the common gaseous paraffins, namely methane ($CH_4$), ethane ($C_2H_6$), propane ($C_3H_8$), and butane ($C_4H_{10}$). Typical proportions of these natural gas ingredients are detailed hereinafter. The physical, chemical and combustion properties of these gaseous fuels vary according to the relative proportions of these ingredients, and it is the primary purpose of the present invention to adjust and control internal combustion engine operation in response to the composition of natural gas fuel so as to provide maximum engine combustion efficiency, while at the same time minimizing undesirable emissions.

Applicant has determined that the combustion characteristics of such gaseous fuels, and hence the resulting internal combustion engine's performance characteristics, are accurate functions of the ratio of hydrogen atoms to carbon atoms in the fuel molecules, known as the H/C ratio, whether this H/C ratio is that of a single one of these gases, such as $CH_4$, or a mixture of any of these $CH_4$, $C_2H_6$, $C_3H_8$, and $C_4H_{10}$ gases. Applicant has also determined that this H/C ratio is a direct function of the ratio of specific heats of such gas or mixture of gases at constant pressure and constant volume ($C_p/C_v=K$), the universal gas constant, the molecular weight of the gas or gases (MW), and the absolute temperature (R) of the individual gas or mixture of these gases. Applicant has discovered that the speed of sound in such gas or mixture of gases varies as a direct function of the H/C ratio. Thus, according to the present invention, the speed of sound in the gaseous fuel supplied to the engine is continuously monitored and measured for continuous adjustment of the engine control unit (ECU) through a microprocessor so as to compensate for changes in the gaseous fuel composition and quality.

Figure 1:
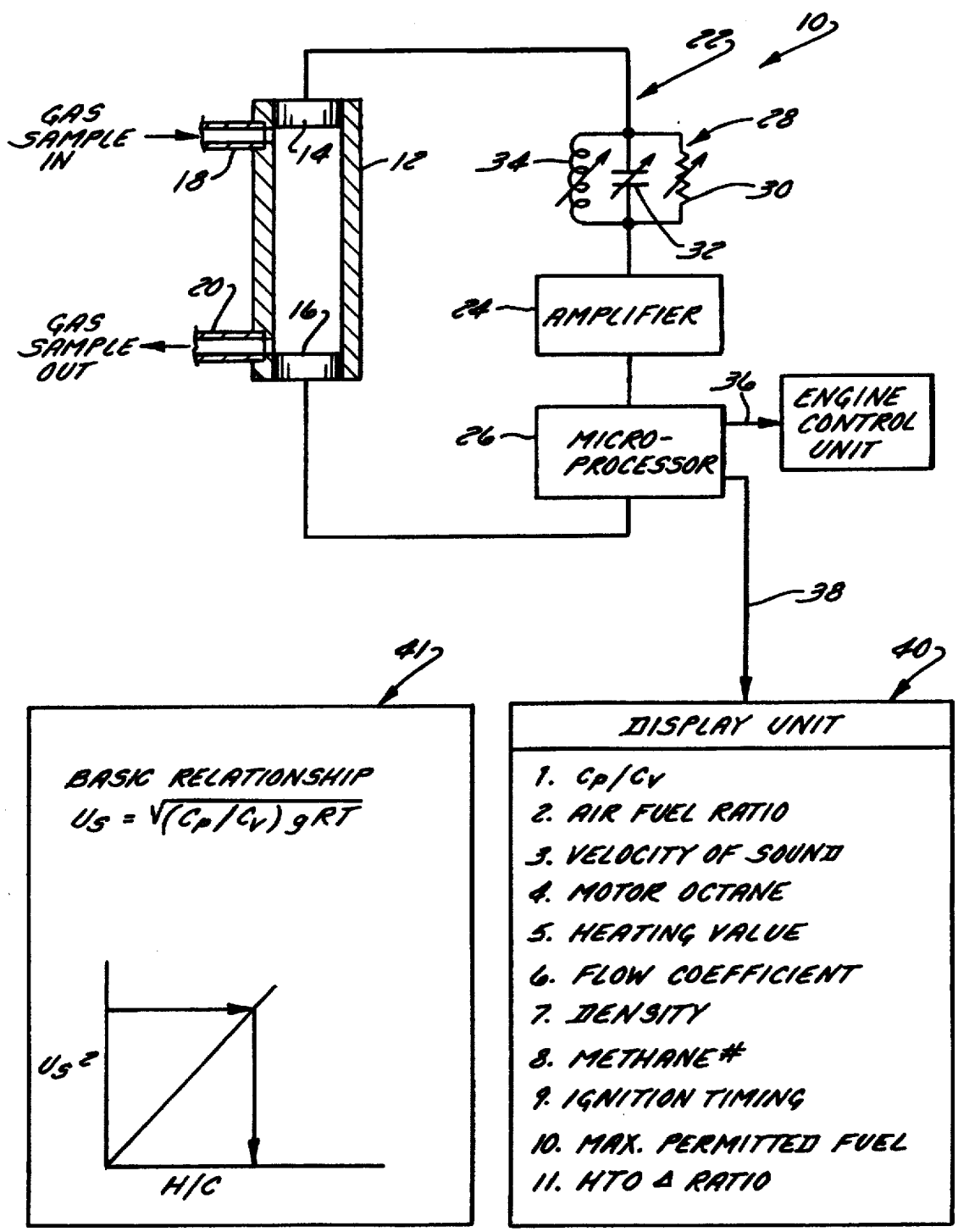
FIG. 1 is a diagrammatic view illustrating apparatus and electronic circuitry according to the invention for engine control and display of useful information relative to a gaseous fuel such as natural gas.

The speed of sound in the gaseous fuel is continuously monitored and displayed in the apparatus illustrated in FIG. 1, and all relevant physical and engine performance characteristics are illustrated in FIGS. 2–12. The revelant formulae employed for programming the microprocssor are all given in english units, and are as follows:

$U_s = \sqrt{KRgT}$ where $U_s$ is the speed of sound in feet per second, $K=C_p/C_v$, the ratio of specific heats of the gas or gas mixture, $C_p$ being the specific heat at constant pressure, and $C_v$ being the specific heat at constant volume, in BTU per pounds per degree F (or per degree Rankine), g is the gravitational constant, 32 feet per second per second, R=1544/MW, where 1544 per °R is the universal gas constant, and MW is the molecular weight of the gas or mixture of gases being tested, and T=temperature Rankine (Fahrenheit on the absolute temperature scale), where R°=F°+460°

Example: where T=520° R, or 60° F., $U_s=129.4 \sqrt{KR}$

While there are a number of different ways that the speed of sound in a gas can be measured, it is presently preferred to determine the speed of sound in the gas being sampled by measuring a resonant frequency (F) in a closed-ended tube having a length L according to the formula F=$U_s$/4L from which it follows that $U_s$=F×4L KR, $U_s$, and the H/C ratio correlate according to the following formula:

KR=$(U_s/129.4)^2$=63.2(H/C−2)

$(C_d)$ actual gas/$(C_d)$ methane=$[(KR)_{CH_4}/(KR)]^{0.38}$

Some of the aforegoing equations are approximate, departing insignificantly from the ideal gas laws, in order to keep the equations within manageable lengths. The concepts of these equations prevail whether the gas or gas mixture fueling the engine is a perfect or ideal gas, or a real gas or gas mixture that is fueling an engine. Any of the variable factors in the equations can be calibrated in the laboratory for each of the pure gases and mixtures of them, thus mitigating any approximation in the equations which may be a small departure from an ideal gas.

FIG. 1 is a diagrammatic view illustrating presently preferred apparatus for measuring the speed of sound in a gaseous fuel such as natural gas, and utilizing this measurement to make adjustments in various engine controls through a suitably programmed engine control unit (ECU), and to provide continuing data on a display unit. The gas composition and quality sensor unit illustrated in FIG. 1 is generally designated 10, and the heart of this unit is a sonic resonating tube 12, which is closed at both ends, having a microphone 14 exposed to the inside of tube 12 at one end, and a speaker 16 exposed to the inside of tube 12 at the other end. In test apparatus the speaker employed was a hi-fi tweeter. The hydrocarbon gas being continuously sampled by sensor unit 10 is continuously flowed through resonating tube 12 from a gas sample inlet tube 18 adjacent one end of tube 12 to a gas sample outlet tube 20 adjacent the other end of tube 12. Inlet and outlet tubes 18 and 20 may be at either end of tube 12, but in FIG. 1 are shown with inlet tube 18 ajacent microphone 14, and outlet tube 20 adjacent speaker 16.

A closed regenerative electronic loop circuit 22 includes microphone 14, an amplifier 24, the ECU microprocessor 26, and a phase adjustment network generally designated 28, which may consist of any one or more of a variable resistor 30, variable capacitor 32 and variable inductor 34, which may be either manually or automatically adjustable. The microprocessor output conductor means to the ECU is designated 36, and provides the ECU with the necessary electronic information for continuously adjusting engine parameters such as ignition timing, gas properties ($C_p/C_v$) (R/MW), maximum permissible fuel per cycle, fuel injector timing, and the like. A second microprocessor output conductor means 38 leads to a display unit 40 which preferably displays, on a continuously varying basis, the following data: (1) $C_p/C_v$ (the ratio of specific heats at constant pressure and constant volume, or K in the foregoing formulae); (2) A/F (the air/fuel ratio); (3) $U_s$ (the speed of sound in the gaseous medium); (4) MON (the motor octane number); (5) $H_v$ (the heating value); (6) $C_d$ (the flow coefficient); (7) the gas density; (8) MN (the methane number); (9) the ignition timing, in degrees before top dead center); (10) the maximum fuel permitted; and (11) the hydrogen-to-carbon ratio, which controls and indicates all of the other factors.

It is preferred that resonating tube 12 be closed at both ends for efficient passage of fuel gas to be monitored. However, it is to be understood that the sensing tube could be open at one or both ends, with the frequency being calculated according to standard sonic resonance frequency formulae. It is also to be understood that a non-resonant time-of-travel signal may be employed to measure the frequency of sound through the gas being sampled. In such case the transit time of a sound pulse is measured over a fixed distance. Such is the mechanism employed in nature by bats, in sonar, and by some cameras today.

In the presently preferred sensor 10 of FIG. 1, amplifier 24 provides the necessary power in regenerative loop circuit 22 to provide a resonant frequency electrical oscillation in the circuit as determined by the frequency of the acoustic resonance in resonating tube 12. Adjustment of one or more of components 30, 32 and 34 of phase adjustment network 28 enables adjustment of the phase angle for the time delay between microphone 14 and speaker 16, although such adjustment will normally not be required since there will almost always be a phase angle which is not precisely 90° out of phase, i.e., it is probable that the output of speaker 16 and input of microphone 14 will never precisely cancel, and there will always be amplification as required for regenerative loop 22 regardless of phase angle adjustment by network 28. If there is insufficient amplification in regenerative circuit 22, this can be compensated for either manually or automatically by variation of one or more of the components of phase adjustment network 28.

If a single gas sample is to be read, resonating tube 12 could be filled by the sample, and blocked off, and the measurement taken. However in most instances, as with an operating engine, the composition and quality of the gas will be variable, and a continuous dynamic measurement will be desired for continuous adjustment of engine operating characteristics. According to the invention, sensor 10 is preferably sufficiently broad in sensing range to enable switching fuels from pure methane to pure butane, with full compensation for such change during operation of the engine, i.e. on the run.

Preferably, the engine fuel gas is derived for sensor unit 10 from the engine input piping at the lowest pressure levels, so that high fuel gas storage pressures (which can be as high as 3,600 psi) need not be dealt with in sensor unit 10. In this way sensor unit 10 does not have to be especially adapted to high pressures, and any departure from ideal gas laws that may result from high pressures need not be compensated for in the system. Preferably, the low-pressure gas for sensor unit 10 is derived at the inlet or outlet of the fuel gas metering valve to the engine, with a pressure on the order of 1–2 atmospheres, with a maximum of about 20 atmospheres for an accurate readout. Thus, the range of gas pressures provided to sensor unit 10 is preferably on the order of from about one to about 20 atmospheres.

Typically, according to the invention, sensor unit 10 will be mounted slightly upstream of the main air inlet to the engine, i.e. slightly upstream of the throttle body.

Test apparatus emboding a resonating tube 12, microphone 14, speaker 16, gas sample inlet and outlet tubes 18 and 20, and a closed regenerative loop 22 embodying an amplifier 24 and a frequency meter has clearly proven the direct correlation between the H/C ratio and the speed of sound in the hydrocarbon gas. In such test apparatus the resonating tube measured approximately 65 inches between the microphone 14 and speaker 16, with a tube internal diameter of approximately ½ inch. The fundamental oscillation frequency with air in resonating tube 12 was approximately 500 Hz, with the velocity of sound in air being approximately 1080 feet per second. Gradually replacing the air in resonating tube 12 with pure butane, the resonating frequency correspondingly gradually dropped from approximately 500 Hz to approximately 324 Hz, indicating that the speed of sound for pure butane dropped down from approximately 1080 feet per second to approximately 700 feet per second. Thus, the frequency in this test procedure dropped by more than 30 percent between air and butane, and the composition and quality of the gas is accurately determinable from the velocity of sound in the gas, as determinable by the frequency in the closed regenerative loop circuit 22.

A gas composition and quality sensor unit 10 according to the invention adapted for mounting on a vehicle may be much smaller than the above-described test apparatus, for space conservation purposes. Thus, to minimize space occupancy a vehicular sensor unit 10 may have a resonating tube 12 on the order of about 1 inch in length, and an ID on the order of about ¼ inch. Preferably sensor unit 10 will be engine-mounted, e.g. slightly upstream of the main air inlet or throttle body.

Chart 41 at the lower left-hand corner of FIG. 1 illustrates the correlation between $U_s$ and both the H/C ratio and $(C_p/C_v)gRT$.

Reference will now be made to FIGS. 2–11, which show ten graphs, all of which relate the velocity of sound to the H/C ratio that is measured in the gas composition and quality sensor unit 10 of FIG. 1 and to the various parameters utilized in microprocessor 26 for controlling the internal combustion engine, and in the above equations, and are also relevant to the internal combustion engine operation. All of these ten curves have the H/C ratio as the abcissas, between H/C ratios of 2.5 and 4.0.

Figure 2:
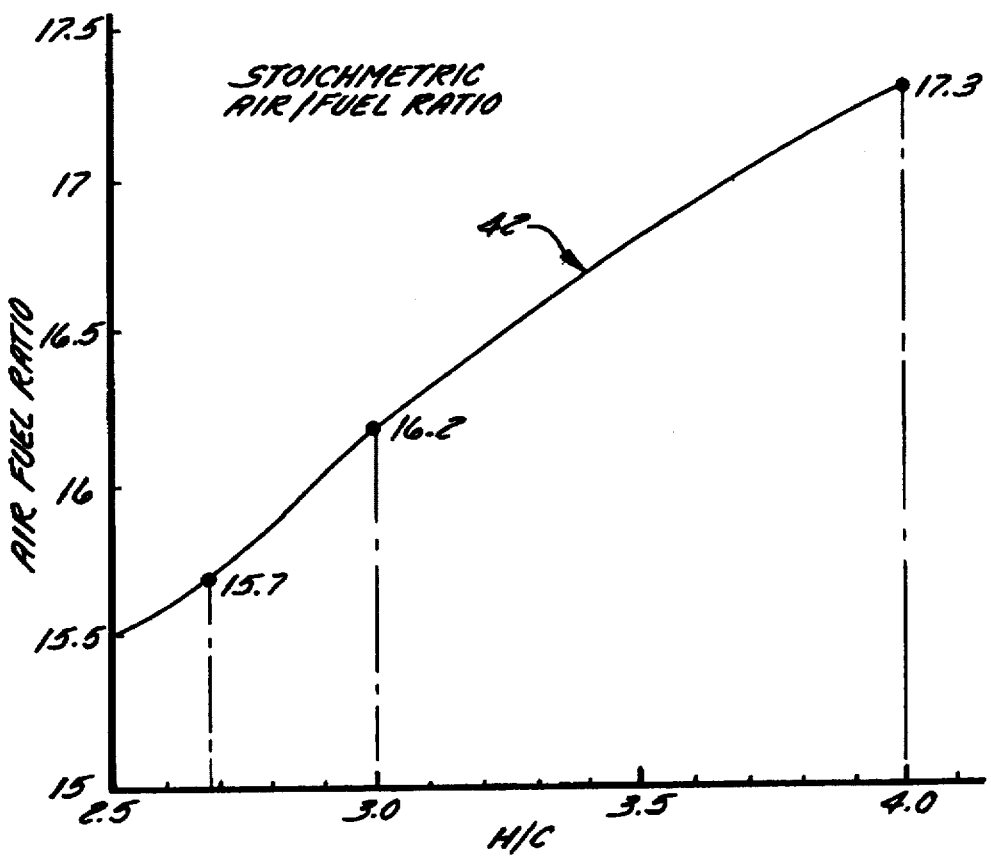
FIG. 2 is a graph plotting stoichiometric air/fuel ratio against the hydrogen/carbon ratio of the fuel.

Curve 42 in FIG. 2 plots the stoichiometric air/fuel ratio on the ordinants vs. the H/C ratio on the abcissas, and it is seen that the stoichiometric air/fuel ratio for butane is approximately 15.5, for propane is approximately 15.7, for ethane is approximately 16.2, and for pure methane is approximately 17.3. This curve is a very precise calculation determined from the H/C ratio and the molecular weights of hydrogen and carbon, and the exact proportions of air that are required to convert all of the H to $H_2O$ and all of the C to $CO_2$.

Figure 3:
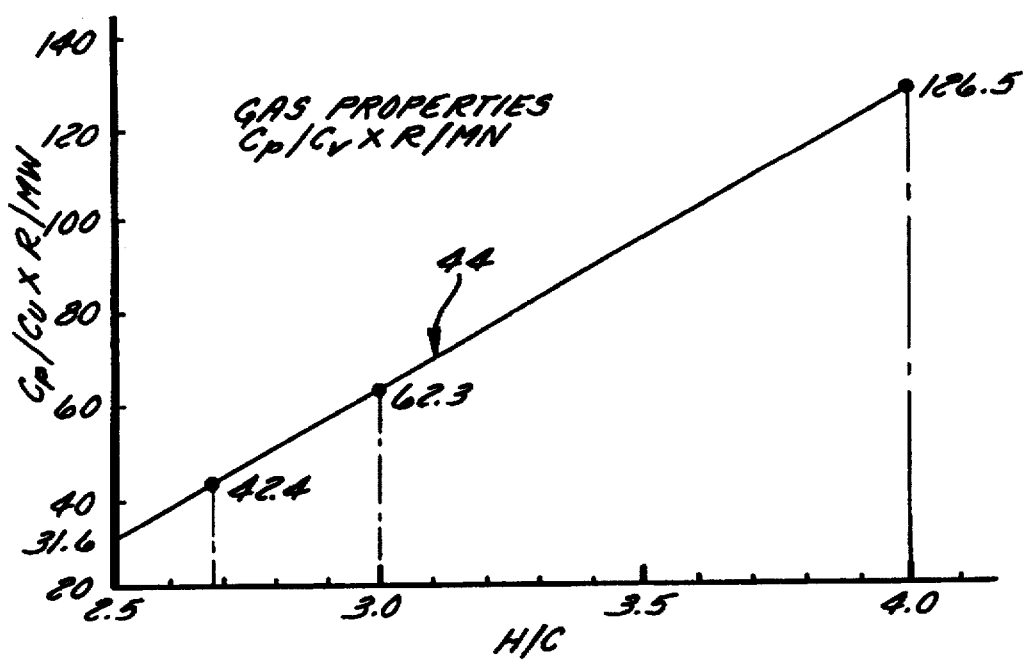
FIG. 3 is a graph plotting gas properties as defined herein against the H/C ratio.

Curve 44 of FIG. 3 illustrates an important part of the present invention, which may be characterized as a discovery. Applicant suspected from his research that there might be a correlation between the ratio of specific heats $C_p/C_v$ times the universal gas constant divided by the molecular weight on the one hand, and the H/C ratio of a saturated hydrocarbon gas or mixture of such gases on the other hand. Nevertheless, applicant was surprised when he made the many-point plot depicted in curve 44 to find that this was a substantially straight-line function defining these gas properties in terms of the H/C ratio. Curve 44 illustrates this direct correlation between the ratio of specific heats $(C_p/C_v)$ and the gas constant for the particular gas or mixture thereof (R/MW) on the ordinants, and the H/C ratio on the abcissas. It is this precise relationship which led applicant to the conclusion that the speed of sound in the hydrocarbon gaseous medium would be almost an exact indicator of not only the H/C ratio but also the critical gas property for the relationship between the ratio of specific heats at constant pressure relative to constant volume ($C_p/C_v$) and the gas constant for the particular hydrocarbon gas or mixture thereof (R/MW). Curve 2 illustrates that this gas property value ($C_p/C_v$)(R/MW) for butane is approximately 31.6, for propane is approximately 42.4, for ethane is approximately 62.3, and for pure methane is approximately 126.5.

Figure 4:
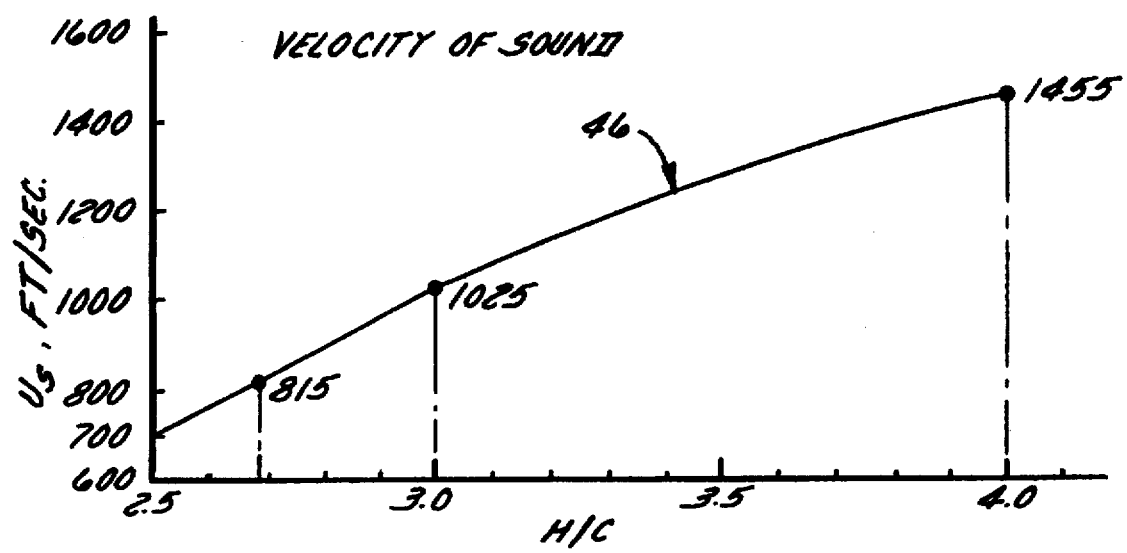
FIG. 4 is a graph plotting the velocity of sound in the gaseous fuel against the H/C ratio.

The velocity of sound in the gaseous fuel medium is plotted on the ordinants vs. the H/C ratio on the abcissas in curve 46 of FIG. 4, and it is the measurement of the speed of sound in sensor unit 10 of FIG. 1 that enables all of the other relevant engine operating characteristics depicted in FIGS. 2–11 to be accurately determined, and utilized as required in microprocessor 26 to control engine performance. While the velocity of sound is not a straight line curve relative to the H/C ratio, it is close to it. The velocity of sound varies widely according to the H/C ratio of the hydrocarbon gas or mixture of gases, which enables very accurate sensing by the gas composition and quality sensor unit 10 of FIG. 1. Thus, the velocity of sound is approximately 700 feet per second for butane, approximately 815 feet per second for propane, approximately 1025 feet per second for ethane, and approximately 1455 feet per second for pure methane.

Figure 5:
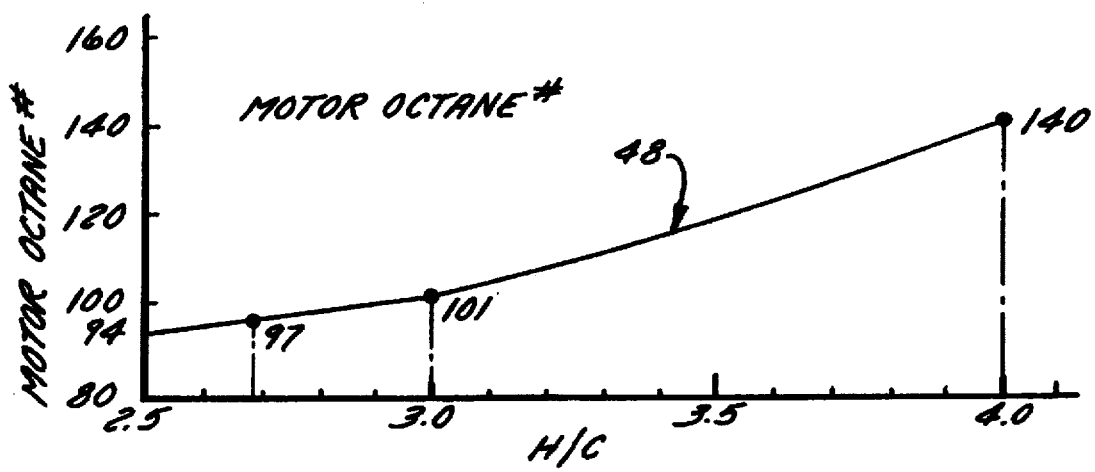
FIG. 5 is a graph plotting motor octane number against the H/C ratio.

Curve 48 of FIG. 5 plots the motor octane number (MON) on the ordinants against the H/C ratio on the abcissas, and again this is relatively close to a straight line function. MON was originally developed as an empirical correlation for the combustion properties of gasoline, being determined by the ratio of the percentage of iso-octane and normal heptane mixed to correlate to the knocking or detonation characteristics of a fuel mixture of gasoline and air. 100 octane gasoline acts as if it were pure octane, while zero octane gasoline acts as if it were a fuel made of pure heptane. This has been used for more than half a century to identify and catalogue the combustion properties of motor fuels. Natural gases follow these same rules, so that an engine test with the precise means to determine the knocking tendency can provide the equivalent octane number of a gaseous fuel or mixture thereof. Pure methane extends the octane rating to a limit of 140, although some use an octane rating of 130 as this upper limit. Thus, in curve 48 the plot of motor octane number against H/C ratio shows an octane number of 94 for butane, 97 for propane, 101 for ethane, and 140 for methane.

Figure 6:
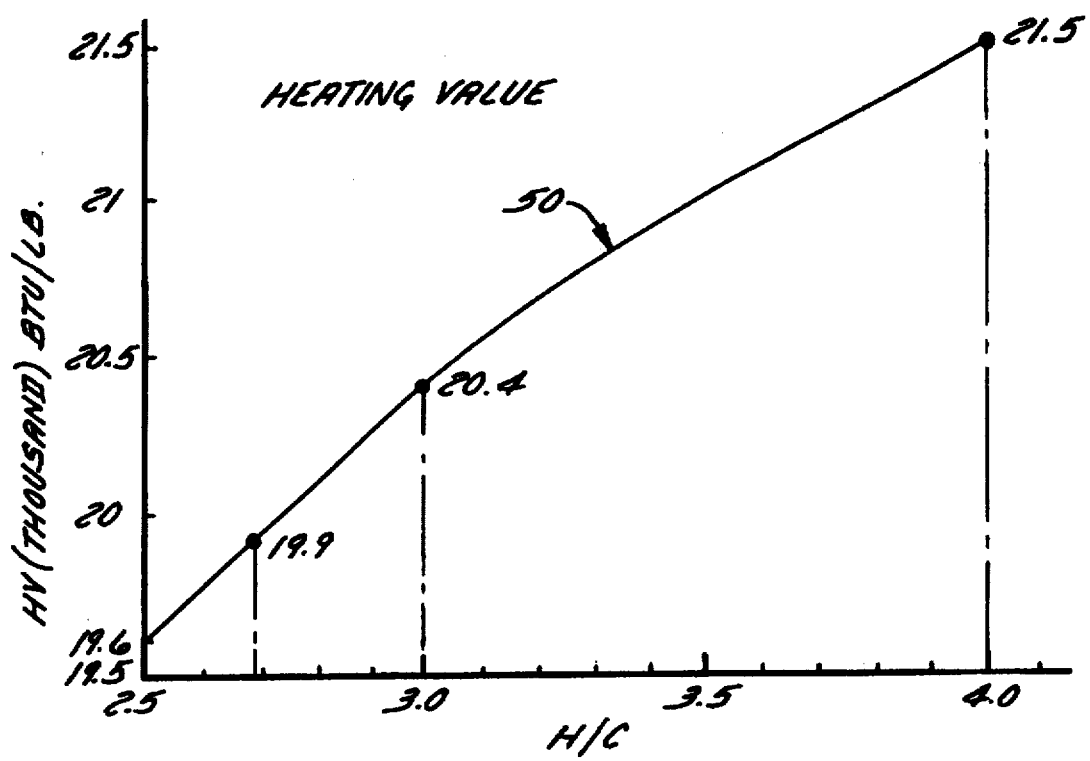
FIG. 6 is a graph plotting heating value against the H/C ratio.

Curve 50 of FIG. 6 for "heating value" illustrates the heat of combustion in BTUs of the gaseous fuel or mixture of gaseous fuels. Curve 50 shows that butane generates in the combustion process 19,600 BTUs per pound, propane generates 19,900 BTUs per pound, ethane gnerates 20,400 BTUs per pound, and methane generates 21,500 BTUs per pound.

As an example, assuming a heat engine system to be designed for ethane, which has a thermal release of 20,400 BTUs per pound, but such equipment is to be run on butane. The weight amount of butane fuel required should be increased by the ratio of 20.4 to 19.6 in order to maintain the same thermal heat release. The velocity of sound (curve 46 of FIG. 4) of 700 feet per second for butane instead of 1025 feet per second for ethane indicates that such correction should be made. As another example of the use of the present invention to maintain a specified thermal release from combustion independent of the fuel gas composition, if the velocity of sound in the gas is measured to be 1025 feet per second (for pure ethane, according to curve 46 of FIG. 4), and a heater is designed to use pure methane, with the speed of sound at 1455 feet per second according to curve 46, the amount of ethane on a weight basis should be increased in proportion to the ratio of heating values of methane (21, 500)/ethane (20,400), identifying the respective heating values of these two gases from the respective velocities of sound in these two gases from curve 46.

Figure 7:
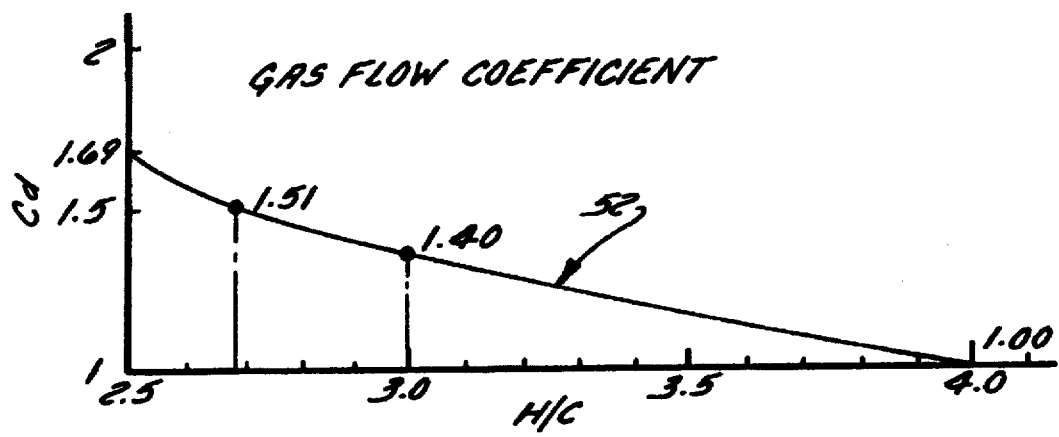
FIG. 7 is a graph plotting gas flow coefficient against the H/C ratio.

Curve 52 of FIG. 7 illustrates the gas flow coefficients of gases ranging from a minimum gas flow coefficient arbitrarily designated 1.0 for methane to a maximum gas flow coefficient for butane of approximately 1.69, with respective gas flow coefficients for ethane of approximately 1.4 and for propane of slightly more than 1.5.

Figure 8:
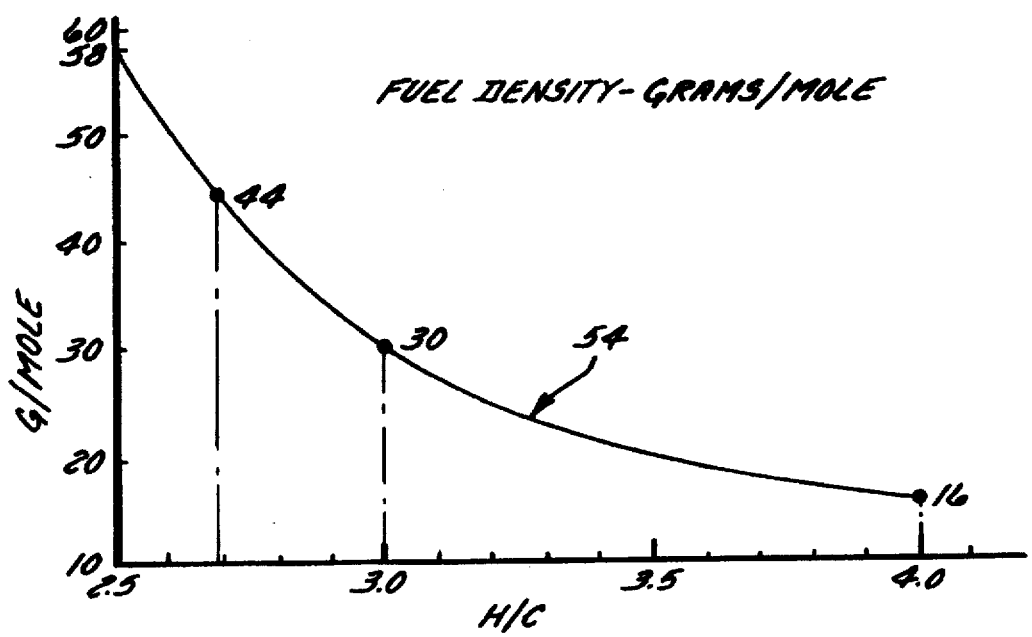
FIG. 8 is a graph plotting fuel density against the H/C ratio.

Curve 54 of FIG. 8 plots fuel density against the H/C ratio, and indicates that the velocity of sound in the gas or mixture of gases can be used to compute the fuel density, just as the velocity of sound can be used to compute the gas flow coefficient as indicated in curve 52. In curve 54 the fuel density in grams per mole is seen to be approximately 16 for methane, approximately 30 for ethane, approximately 44 for propane, and approximately 58 for butane.

Figure 9:
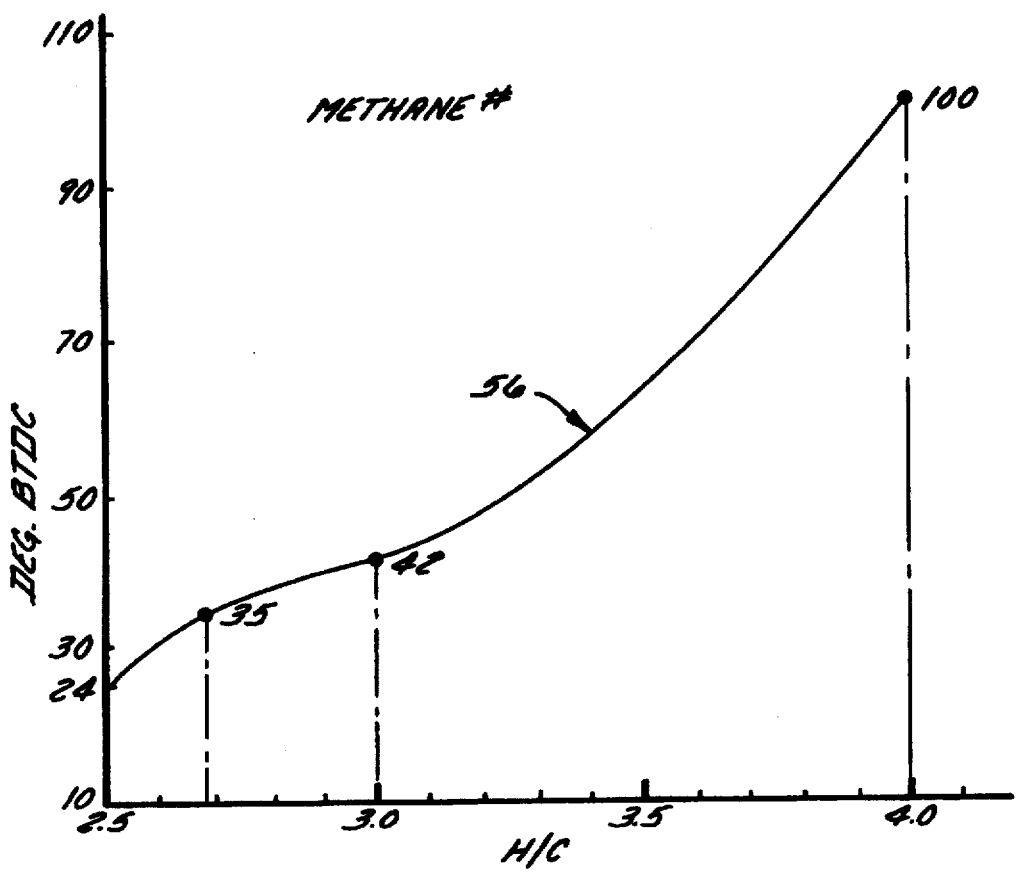
FIG. 9 is a graph plotting the methane number of the gaseous fuel against the H/C ratio.

Referring to curve 56 of FIG. 9, the methane number is determined experimentally by using mixtures of hydrogen and methane from zero to 100 percent of each, and this curve correlates with the octane number shown in curve 48 of FIG. 5. The methane number was arbitrarily devised in order to extend the octane number beyond the octane number of 100 for gasoline. Both the motor octane number of curve 48 and the methane number of curve 56 are empirical.

Figure 10:
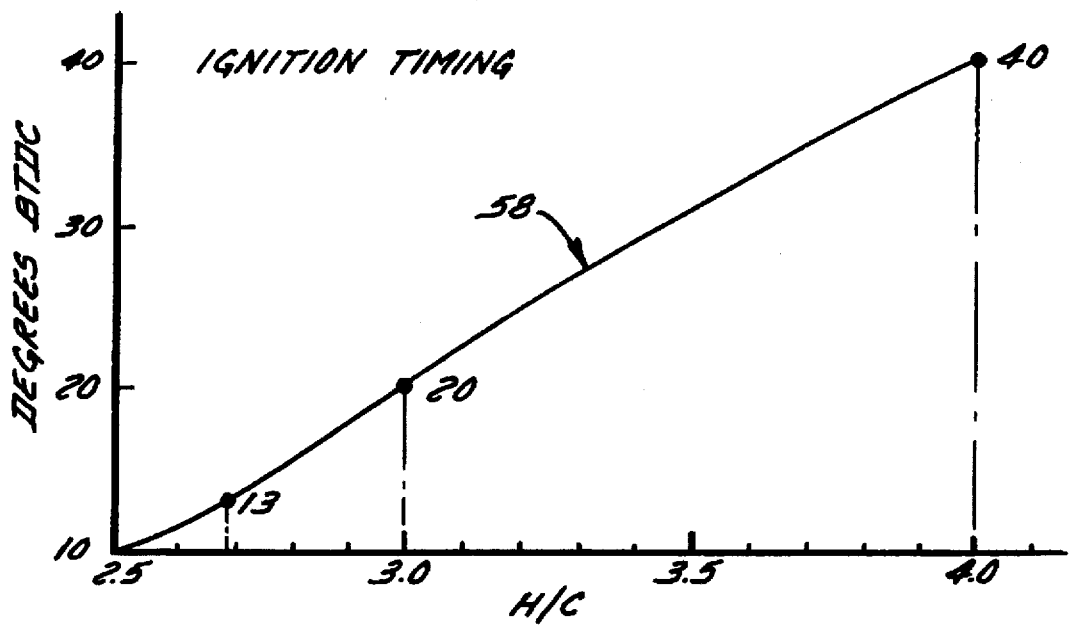
FIG. 10 is a graph plotting ignition timing in degrees before top dead center against the H/C ratio.
Figure 11:
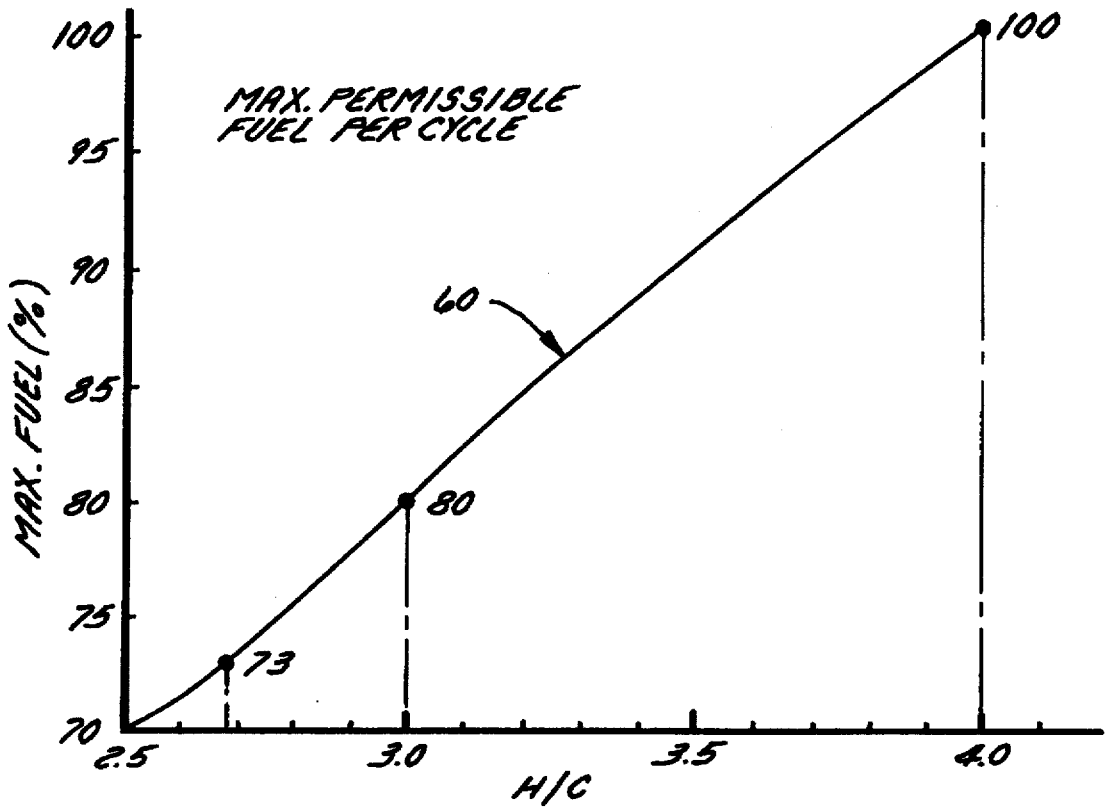
FIG. 11 is a graph plotting the maximum permissible fuel per cycle against the H/C ratio.

Curve 58 of FIG. 10, ignition timing, indicates that as the fuel composition changes, it is necessary to make an engine ignition timing adjustment. The velocity of sound in the gaseous fuel as determined by sensor unit 10 will, through microprocessor 26, automatically adjust the engine timing to accommodate such fuel composition change. For example, for pure methane, with an H/C ratio of 4.0, and a motor octane number of 140 as seen in curve 48, ignition timing as seen in curve 58 may be approximately 40° before top dead center (BTDC). If the H/C ratio sensed by sensor unit 10 decreases to approximately 3.0, the H/C ratio for ethane, having a motor octane number approximately 101 as indicated in curve 48, the ignition timing as indicated in curve 58 is to be retarded to approximately 20° BTDC as shown in curve 9. Similarly, to avoid knocking or detonation for an H/C ratio representative of propane the ignition timing should be retarded to approximately 13° BTDC, and for an H/C ratio representing butane the ignition timing should be retarded to approximately 10° BTDC.

Curve 60 relates the maximum permissible fuel per cycle to the H/C ratio in percentage, with 100 percent attributed to pure methane with an H/C ratio of 4.0 down to approximately 80 percent at an H/C ratio of approximately 3.0 for ethane, approximately 73 percent at an H/C ratio of approximately 2.7 for propane, down to approximately 70 percent maximum permissible fuel per cycle at an H/C ratio of 2.5 for butane.

FIG. 3 is a chart correlating the H/C ratio of methane ($CH_4$), ethane ($C_2H_6$), propane ($C_3H_8$), and butane ($C_4H_{10}$) with the following eight factors:

1. Percentage speed of sound and resonant frequency of the gas in a tube compared to methane ($CH_4$)
2. Motor octane number
3. Methane number
4. Butane number
5. Stoichiometric air/fuel ratio
6. Heating value in BTU per pound
7. Relative density 8. KR, which is $(C_p/C_v)(1544/MW)$, where $C_pC_v$ is the ratio of specific heat at constant pressure to specific heat at constant volume, times the universal gas constant divided by the average molecular weight of the gas or gases. These relationships are reflected in curves 42–60.

Thus, for a mixture of gaseous fuels consisting mostly of methane, ethane, propane and butane, the combustion properties of the gross mixture are related closely to the ratio of hydrogen atoms to carbon atoms in the mixture of fuels. For example, the stoichiometric air-to-fuel ratio is precisely a function of the overall ratio of hydrogen atoms to carbon atoms in the fuel mixture. It has been shown empirically that motor octane number, methane number and butane number are accurately determinable from this same H/C ratio, as indicated in the above chart and FIGS. 2–11 of the drawings. The correlation between the overall H/C ratio for such a mixture of gases and the velocity of sound through the mixture is surprisingly accurate and repeatable, according to the values indicated in curve 46 of FIG. 4.

The sound velocity information derived from resonating tube 12 is employed by microprocessor 26 to determine the H/C ratio in the fuel mixture, which in turn enables microprocessor 26 to make desired engine adjustments for optimum fuel consumption and minimum pollutant outputs. Such adjustments include but are not limited to adjustment of the fuel flow rate, adjustment of the ignition timing, adjustment of the air/fuel ratio, and adjustment of fuel injector timing. Such adjustments have never before been automatically achievable on a continuous, on-the-run basis for vehicular internal combustion engines.

Natural gas consists primarily of methane, and to be a useful fuel must normally consist of at least approximately 85 percent methane, with much smaller proportions of ethane, propane and butane, and some other impurities such as carbon dioxide, nitrogen, carbon monoxide and hydrogen. Preferably, natural gas with which the present invention is applied should consist of more than 90 percent methane, and with 90 percent methane typically there may be approximately three percent ethane, one percent propane and less than 0.5 percent butane.

The output 36 of microprocessor 26 to the ECU of a gaseous fuel-burning internal combustion engine may be employed to adjust any one or more of a number of different operating parameters including but not limited to adjustment of ignition timing, adjustment of the fuel flow rate, adjustment of the air/fuel ratio, adjustment of fuel injection timing, adjustment of pilot oil fuel quantity and timing in a dual fuel system burning primarily gaseous fuel, with pilot injection of diesel or other oil fuel (as disclosed in Kelgard U.S. Pat. No. 4,742,801), and adjustment of any of these engine operating parameters to adapt to selected or random changes in fuel supply.

While the present invention has been described with regard to particular embodiments, it is to be understood that modifications may readily be made by those skilled in the art, and it is intended that the claims cover any such modifications which fall within the scope and spirit of the invention as set forth in the appended claims.

What is claimed is:

1. A method comprising:
   (A) automatically and continuously determining the velocity of sound ($U_s$) in a gaseous hydrocarbon fuel flowing into a fuel inlet of an internal combustion engine;
   (B) automatically and continuously determining the hydrogen atom to carbon atom ratio (H/C ratio) of said gaseous fuel from said $U_s$;
   (C) automatically and continuously detecting a change in $U_s$ of said gaseous fuel;
   (D) automatically detecting a change in H/C ratio of said gaseous fuel as a result of said change in $U_s$; and
   (E) automatically and continuously adjusting operation of said internal combustion engine based upon and in response to said step (D), thereby to optimize engine operation on the basis of the prevailing H/C ratio.

2. A method according to claim 1, wherein
   (A) said step of determining $U_s$ comprises
      (1) determining the resonant frequency (F) of said gaseous fuel in a closed-ended tube having a length (L), and then
      (2) calculating $U_s$ in said gaseous fuel according to the equation: $U_s = F \times 4L$; and wherein
   (B) said step of determining the H/C ratio of said gaseous fuel comprises directly determining the H/C ratio of said gaseous fuel using (1) $U_s$ as calculated in said step (B) and (2) empirically determined data representing sound velocities in known gaseous fuels having known H/C ratios.

3. A method as defined in claim 1, wherein said engine is a spark ignition engine, and wherein said adjusting step comprises adjusting at least one of ignition timing and fuel injection timing.

4. A method as defined in claim 1, wherein said engine is a dual-fuel compression-ignition engine fueled by primary and pilot fuels, and wherein said adjusting step comprises adjusting at least one of adjusting ignition timing, air/primary fuel ratio, primary fuel injection timing, pilot fuel injection quantity, and pilot fuel injection timing.

5. A method as defined in claim 1, wherein said engine is a spark ignition engine, and wherein said adjusting step comprises adjusting ignition timing, air/fuel ratio, and fuel injection timing.

6. A method as defined in claim 1, wherein said engine is a dual fuel compression-ignition engine fueled by primary and pilot fuels, and wherein said adjusting step comprises adjusting ignition timing, air/primary fuel ratio primary fuel injection timing, and at least one of pilot fuel injection quantity and pilot fuel injection timing.

7. A method comprising:
   (A) automatically and continuously determining the composition of a gaseous hydrocarbon fuel flowing into a fuel inlet of an internal combustion engine;
   (B) automatically and continuously detecting a change in the composition said gaseous fuel flowing in to the fuel inlet of the internal combustion engine; and
   (C) automatically and continuously adjusting operation of said internal combustion engine based upon and in response to said step (B), thereby to optimize engine operation on the basis of the prevailing composition of said gaseous fuel.

8. A method as defined in claim 7, wherein said engine is a spark ignition engine, and wherein said adjusting step comprises adjusting at least one of ignition timing and fuel injection timing.

9. A method as defined in claim 7, wherein said engine is a dual-fuel compression-ignition engine fueled by primary and pilot fuels, and wherein said adjusting step comprises adjusting at least one of adjusting ignition timing, air/primary fuel ratio, primary fuel injection timing, pilot fuel injection quantity, and pilot fuel injection timing.

10. A method as defined in claim 7, wherein said engine is a spark ignition engine, and wherein said adjusting step comprises adjusting ignition timing, air/fuel ratio, and fuel injection timing.

11. A method as defined in claim 7, wherein said engine is a dual fuel compression-ignition engine fueled by primary and pilot fuels, and wherein said adjusting step comprises adjusting ignition timing, air/primary fuel ratio, primary fuel injection timing, and at least one of pilot fuel injection quantity and pilot fuel injection timing.

12. A method according to claim 7, wherein the step of determining the composition of said gaseous fuel comprises determining the hydrogen atom to carbon atom ratio (H/C ratio) of said gaseous fuel by first determining the speed of sound $U_s$ in said gaseous fuel and then determining the H/C ratio of said gaseous fuel using the determined $U_s$.

13. A method comprising:

(A) providing an internal combustion engine having a fuel inlet;

(B) automatically and continuously determining the velocity of sound ($U_s$) in a gaseous hydrocarbon fuel as said gaseous fuel flows to said fuel inlet to thereby obtain an indication of the hydrogen to carbon ratio (H/C ratio) of said gaseous fuel;

(C) automatically and continuously detecting a change in the $U_s$ of fuel flowing to said fuel inlet to thereby obtain an indication that the H/C ratio of said gaseous fuel has changed;

(D) automatically and continuously adjusting at least one engine operating parameter, based upon and in response to said step (C), thereby to optimize engine operation on the basis of the prevailing H/C ratio.

14. A method as defined in claim 13, wherein said engine is a spark ignition engine, and wherein said adjusting step comprises adjusting at least one of ignition timing and fuel injection timing.

15. A method as defined in claim 14, wherein said step (D) comprises retarding ignition timing upon sensing a decrease in the H/C ratio of the fuel flowing to said fuel inlet.

16. A method as defined in claim 13, wherein said engine is a dual-fuel compression-ignition engine fueled by primary and pilot fuels, and wherein said adjusting step comprises adjusting ignition timing, air/primary fuel ratio, primary fuel injection timing, pilot fuel injection quantity, and pilot fuel injection timing.

* * * * *